Oct. 14, 1952     W. M. ALLEN     2,613,620

METHOD OF PREPARING DOUGH FOR BAKING

Filed Aug. 9, 1947

INVENTOR.
WILLIAM M. ALLEN.
BY Allen + Allen

ATTORNEYS.

Patented Oct. 14, 1952

2,613,620

UNITED STATES PATENT OFFICE 2,613,620

METHOD OF PREPARING DOUGH FOR BAKING

William M. Allen, Glendale, Ohio, assignor to Model Crafters Inc., Hamilton, Ohio, a corporation of Ohio Application August 9, 1947, Serial No. 767,822

2 Claims. (Cl. 107—54)

This invention relates to a die for a cookie press or the like for extruding dough for use in the baking of pies, small cakes, and the like.

Cookie presses are well known and comprise generally a cylinder with a ram therein, which ram may be actuated by a screw or otherwise and a suitable dough is placed in such cylinder, a cap incorporating a die is placed on the end of said cylinder and the dough is then extruded out through the die in the shape enforced by the die. It has been conventional to provide dies of star shape, leaf shape, and various animal shapes, and the like. For making cookies with such dies, a suitable amount of dough is extruded through the die and sliced off, producing a piece of dough of the desired thickness and having the outline of the die.

The present invention relates to a novel die having a spiral slot therein so that the dough which is extruded from the press is in the form of a spiral. The dough may be extruded a small amount at a time and sliced off for making cookies, or a considerable length may be extruded to provide a pie crust.

One of the objects of the present invention is to provide a die for use in a cookie press or the like which will produce extruded dough in roll form, which may then be unrolled for the making of pie crust, or which may be sliced into segments for the making of cookies.

It is another object of my invention to provide a device as outlined above which will have long wearing qualities and is not subject to bending or breakage because of the pressure of the dough upon it.

These and other objects of my invention which I shall point out more in detail hereinafter or which will be apparent to one skilled in the art upon reading this specification, I accomplish by that certain construction and arrangement of parts of which I shall now describe certain exemplary embodiments.

Reference is made to the drawing forming a part hereof, and in which.

Briefly, in the practice of my invention, I provide a die having a spiral slot therein whereby dough extruded therethrough will come out in the form of a roll. Since the dough used in making pies is relatively stiff, there will be considerable pressure on the die, while the dough is being extruded, and therefore I prefer to make the die of a relatively strong material and of substantial thickness to withstand this pressure.

Figure 1:
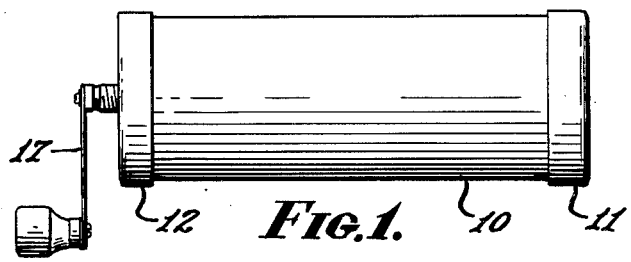
Figure 1 is a side elevational view of a cookie press incorporating my invention.
Figure 2:
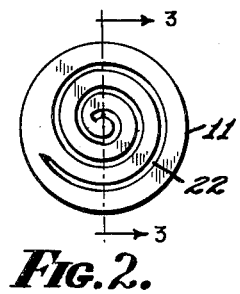
Figure 2 is an end elevational view of the same.
Figure 3:
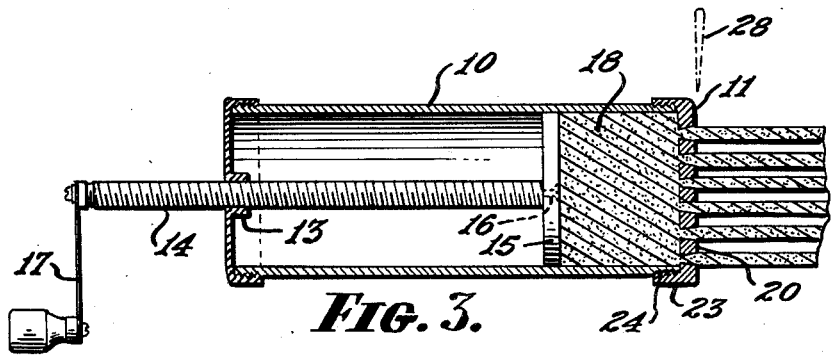
Figure 3 is a cross sectional view taken on the line 3—3 of Figure 2 showing a quantity of dough in the process of being extruded.

Referring more particularly to the drawings, I have shown in Figures 1, 2, and 3 a cookie press of more or less conventional structure comprising a cylinder 10 having at one end a cap 11 including a die and at the other end a cap 12 provided with a boss 13 constituting a nut for the screw 14. A plunger 15 is secured to the screw 14 as at 16, and a handle member 17 is secured to the outer end of the screw 14. It will be clear that if a quantity of dough 18 is placed in the cylinder 10 and the handle 17 is turned in the appropriate direction, the dough will be compressed toward the cap 11 and extruded therethrough.

Figure 6:
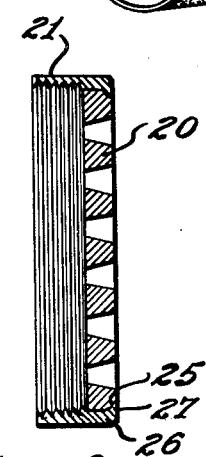
Figure 6 is a cross sectional view of the die with a separate annular attaching member, the view being similar to that of Figure 3 but on an enlarged scale.

My invention relates particularly to the cap 11 and I have illustrated it in two embodiments. In the embodiment of Figures 1 to 3, inclusive, the die is formed as an integral part of the cap 11; while in the embodiment of Figure 6, the die is retained in an annular threaded member 21, which is simply screwed on to the end of the cylinder 10. The embodiment of Figure 6 is useful where it is desired to have a universal cookie press in which various dies may be used interchangeably.

Coming now to the description of the die itself, it will be observed from the figures that the die contains a spiral slot 22. This slot may be of any length, but for the purpose of making pies, I prefer to make the slot have a length of about 10½ inches. Thus, if a roll 10½ inches in width is extruded from the press and cut off, the roll can be unrolled to provide a piece of pie dough about 10½ inches square which will be satisfactory for baking a normal size pie.

Because of the extensive pressure on the die, the die, as shown, will have to be of substantial thickness and of a relatively strong material. By way of example, I prefer that the die be made of stainless steel which has the advantage of strength and the additional advantage that it is not deleteriously affected by any components of the pie dough. Also, by way of example, I prefer to make the die of a thickness of about ¼ inch.

It will be observed that the slot 22 is flared outwardly in the direction of extrusion. That is, the width of the slot is greater on the outside than on the inside.

It is to be understood that I can extrude dough with the flare of the slot 22 directed inwardly or outwardly, and in both cases, I have the advantage of easier cleaning of the die. However I have found that when the pie dough is being extruded from the press, it is first compressed and as it passes through the die orifice it tends to swell out somewhat, and I have found that by making the outer end of the slot wider, a smoother extrusion is accomplished. By way of example, I prefer to make the slot at the inner side of the die plate 20 of a width of about 3/32 of an inch and on the outer face of a width of about 3/16 of an inch.

In the embodiment of Figure 3, the die plate 20 proper is provided with the annular flange 23, which is internally threaded, as at 24, for engagement with the threaded end of the cylinder 10. Thus, the annular flange 23 and the die plate 20 are integral and together constitute a cap for the cylinder.

In the embodiment of Figure 6, the die plate 20 is the same in all respects as that of Figure 3, except that it is not provided with the annular flange and is preferably chamfered as indicated at 25. An internally threaded ring 26 is provided which is internally chamfered as at 27, so that the die plate 20 may be inserted therein from the left of Figure 6, and will be retained against passing through the member 26 by the engaging chamfered surfaces 25 and 27. With this embodiment, the member 26 may be unscrewed from the cylinder and the die plate replaced with any conventional die for making cookies of various desired shapes.

Figures 4, 5:
Figure 4 is a perspective view of a roll of dough produced with the die according to my invention.
Figure 5 is a perspective view of a small section cut from the roll of Figure 4.

In Figure 3, I have indicated in broken lines at 28 a knife which may be used for cutting off the extruded dough by simply slicing over the outer surface of the die plate 20 or, if it is desired to bake spiral cookies, a short roll a quarter inch in length may be extruded and sliced off for baking. But for making pie dough, I prefer to extrude about 10½ inches of the dough to form a roll, such as shown in Figure 4. This roll may be unrolled to form a square piece of dough approximately 10½ inches on a side.

If it is desired to cut out cookies of certain shapes by means of conventional cookie cutters, a much greater length of dough may be extruded to form a sheet of dough 10½ inches in spiral length and of a width limited only by the capacity of the cylinder 10. This may be unrolled and desired shapes cut therefrom by means of any conventional cookie cutters.

Among other items that may be made from a sheet or strip of dough prepared as above described, are jelly rolls, canapes, lattice work strips for open-face pies and the like. The jelly roll mentioned herein differs from the conventional jelly roll, in that it comprises a relatively long, narrow strip of pie dough (which may be a scrap or remnant from some other baking operation) which is covered with jelly, cinnamon and sugar, or the like, and rolled up for baking.

In addition to the cookies made from a section of dough extruded in roll form and sliced off the end of the die as described above, it is also possible to make rolls, biscuits and the like, in the same manner. Advantages of this procedure are that the cookies, rolls, biscuits, etc. are produced in spiral form, which is a novel shape, and because of the relative thinness of the spiral, it is possible to obtain an even baking, whereby soggy center portions are eliminated.

An additional advantage of the taper of the spiral slot is that cleaning of the die is greatly facilitated, since dough masses once dislodged from the narrow edge of the die tend to fall free without further difficulties.

Probably the greatest single advantage of this invention is that it eliminates the skill factor involved in working dough preparatory to baking, as by means of a rolling pin or the like. Considerable skill is required to work dough with a rolling pin without toughening it by excessive rolling, or upsetting the proper composition of the mix by frequent additions of flour to prevent sticking, etc.

It will be clear that minor modifications may be made without departing from the spirit of my invention. For this reason, what I consider novel and claim is:

1. The method of preparing dough for baking which includes the steps of extruding the dough through a long continuous convoluted orifice, cutting off a length of extruded dough, and opening the extruded length of dough into a flat sheet, said sheet having a width equal to the length of said orifice and the length depending upon the amount of dough extruded.

2. The method of preparing dough for baking which includes the steps of extruding the dough through a long, continuous, spiral orifice, in the form of a roll, cutting off a length of extruded dough and unwinding said roll into a flat sheet, said sheet having a width equal to the length of said spiral orifice and a length depending upon the amount of dough extruded.

WILLIAM M. ALLEN.

REFERENCES CITED

The following references are of record in the file of this patent:

UNITED STATES PATENTS

| Number | Name | Date |
|---|---|---|
| 208,363 | Brandeis | Sept. 24, 1878 |
| 1,507,516 | Richardson | Sept. 2, 1924 |
| 1,535,852 | Ornbo | Apr. 28, 1925 |
| 1,996,628 | Schneider | Apr. 2, 1935 |
| 2,070,096 | Smith | Feb. 9, 1937 |
| 2,419,654 | Moore | Apr. 29, 1947 |

FOREIGN PATENTS

| Number | Country | Date |
|---|---|---|
| 436,123 | France | Mar. 19, 1912 |